US009281912B2

(12) United States Patent
Peng et al.

(10) Patent No.: US 9,281,912 B2
(45) Date of Patent: Mar. 8, 2016

(54) INDICATION AND PROCESSING METHOD AND DEVICE FOR RESOURCE OCCUPANCY MODE

(75) Inventors: Ying Peng, Beijing (CN); Xueming Pan, Beijing (CN); Rui Zhao, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 184 days.

(21) Appl. No.: 14/123,113

(22) PCT Filed: Mar. 29, 2012

(86) PCT No.: PCT/CN2012/073241
§ 371 (c)(1),
(2), (4) Date: Jan. 6, 2014

(87) PCT Pub. No.: WO2012/163166
PCT Pub. Date: Dec. 6, 2012

(65) Prior Publication Data
US 2014/0133365 A1    May 15, 2014

(30) Foreign Application Priority Data

May 31, 2011   (CN) .......................... 2011 1 0144852

(51) Int. Cl.
*H04B 7/005* (2006.01)
*H04J 3/16* (2006.01)
(Continued)

(52) U.S. Cl.
CPC ............. *H04J 3/1694* (2013.01); *H04L 1/1861* (2013.01); *H04L 5/0053* (2013.01);
(Continued)

(58) Field of Classification Search
CPC ................................... H04L 5/0094
See application file for complete search history.

(56) References Cited

U.S. PATENT DOCUMENTS

| 2012/0281646 | A1* | 11/2012 | Liao et al. | 370/329 |
| 2013/0188569 | A1* | 7/2013 | He et al. | 370/329 |
| 2014/0071952 | A1* | 3/2014 | Kim et al. | 370/335 |

FOREIGN PATENT DOCUMENTS

| CN | 101765184 A | 6/2010 |
| CN | 101908955 A | 12/2010 |

(Continued)

OTHER PUBLICATIONS

Extended European Search Report issued Oct. 31, 2014, for the counterpart European Application 12792956.0, 27 pages.
(Continued)

*Primary Examiner* — Huy D Vu
*Assistant Examiner* — Kevin Cunningham
(74) *Attorney, Agent, or Firm* — Kilpatrick Townsend & Stockton LLP

(57) ABSTRACT

There is disclosed a method of indicating a resource occupancy scheme and processing a resource occupancy scheme indicator so as to enable a UE to be aware a resource occupancy scheme of the network side and avoid an unnecessary power waste and unnecessary interference, and in the method, a base station generates a corresponding resource indicator for a resource occupancy scheme of a legacy control resource area and an enhanced control resource area in each downlink subframe to be transmitted in a specific periodicity and sends the resource indicator to a UE in a resource indication message, and the UE determines from the obtained resource indicator the resource occupancy scheme of the legacy control resource area and the enhanced control resource area in each downlink subframe to be transmitted in the specific periodicity and performs a corresponding resource handling mode, so that the UE can blindly detect in PDCCH common and user spaces or receive control information carried on PHICH resource at an accurate position to thereby avoid an unnecessary power waste of and unnecessary interference to the UE due to blind detection or reception and improve effectively the performance of a system.

14 Claims, 11 Drawing Sheets

(51) Int. Cl.
  *H04W 72/04* (2009.01)
  *H04L 5/00* (2006.01)
  *H04L 1/18* (2006.01)
  *H04L 5/14* (2006.01)
  *H04W 84/04* (2009.01)

(52) U.S. Cl.
  CPC ............ *H04L5/0092* (2013.01); *H04L 5/0094* (2013.01); *H04L 5/14* (2013.01); *H04L 5/1469* (2013.01); *H04W 72/042* (2013.01); *H04W 84/045* (2013.01)

(56) References Cited

FOREIGN PATENT DOCUMENTS

| CN | 102045850 A | 5/2011 |
| CN | 102065545 A | 5/2011 |
| CN | 102202400 A | 9/2011 |
| KR | 20100082291 A | 7/2010 |
| WO | 2010026108 A2 | 3/2010 |

OTHER PUBLICATIONS

QUALCOMM Incorporated: 'eICIC Aperiodic, CSI Feedback Restriction', 3GPP Draft; R4-110220, 3rd Generation Partnership Project (3GPP), Mobile Competence Centre ; 650, Route Des Lucioles ; F-06921 Sophia-Antipolis Cedex ; France, vol. RAN WG4, No. Austin; 20110117, Jan. 12, 2011, XP050475278, [retrieved on Jan. 12, 2011] * Subsection 2.1 *.
International Search Report for PCT/CN2012/073241.
3GPP TSG RAN Working Group 1 Meeting #63, Jacksonville, US, Nov. 15-19, 2010.

\* cited by examiner

INDICATION AND PROCESSING METHOD AND DEVICE FOR RESOURCE OCCUPANCY MODE

This application is a US National Stage of International Application No. PCT/CN2012/073241, filed on Mar. 29, 2012, designating the United States and claiming the benefit of Chinese Patent Application No. 201110144852.4, filed with the Chinese Patent Office on May 31, 2011 and entitled "Method of and apparatus for indicating resource occupancy scheme and processing resource occupancy scheme indicator", which is hereby incorporated by reference in its entirety.

FIELD OF THE INVENTION

The present invention relates to the field of communications and particularly to a method of and apparatus for indicating a resource occupancy scheme and processing a resource occupancy scheme indicator.

BACKGROUND OF THE INVENTION

Along with a constantly increasing data rate and service load as required, a conventional access over single-layer coverage by a macro base station has failed to satisfy the demand, and consequently existing systems have come to gradually attempt an access over layered coverage, that is, some low-power base stations, e.g., a Home eNodeB, a pico base station, a femto base station, a relay node, etc., are deployed in a hotspot area or indoors to cooperate with the macro base station for signal coverage to thereby well satisfy the constantly increasing demand. A low-power base station is a base station device used in a home indoor environment, an office environment or another hotspot low-coverage environment to enable an operator to offer a more appealing service at a higher data rate and a lower cost. Particularly the femto base station restricts an accessing member subscriber somehow while disallowing a non-member subscriber for an access, and if the non-member subscriber enters a coverage area of the femto base station, then the subscriber has to reside at an accessible base station (e.g., the macro base station) with use of an Almost Blank Subframe (ABS) based upon a TDM Inter-Cell Interference Coordination (ICIC) (an interference subframe obviation mechanism); otherwise, the subscriber may enter a coverage hole due to a strong signal of the femto base station and consequently become inoperative. If the pico base station is at the same frequency as the macro base station, then the subscriber also may become inoperative due to strong interference, and also the interference problem has to be addressed with use of an ABS subframe based upon the TDM ICIC mechanism.

For example, referring to FIG. 1, a UE1 is served by a macro base station, and a femto base station can only serve an authorized CSG (Closed Subscriber Group) subscriber, and since a UE2 is a CSG subscriber, the subscriber can access the femto base station after being authenticated, but when the UE1 is located in a coverage area of the femto base station, since the UE1 is a UE served by the macro base station (referred to as an MUE) instead of an authorized CSG subscriber, even if the strength of a signal of the femto base station is currently far above the strength of a signal of the macro base station, the UE1 can not be switched to the femto base station and may be further subjected to strong interference from the femto base station, and as such the subscriber UE1 may suffer from a very poor channel condition, a call drop and even inoperability. In the existing LTE protocol, the problem of downlink interference in the foregoing situation can be addressed in the following particular ABS subframe obviation solution:

Due to strong interference of the femto base station to the macro base station, ABS subframes can be used at the femto base station for avoidance, where at the network side, the macro base station and the femto base station coordinate allocation of the subframes between them and notify the UE of a coordination result, so when the non-member MUE becomes inoperative due to strong interference of the femto base station, an ABS subframe obviation configuration is applied so that the MUE measures and transmits data only in the ABS subframes notified of by the network side, particularly as illustrated in FIG. 2. Since the femto base station stops scheduling of data fields and transmits only CRS (Common Reference Signal) (common pilot) signals in the ABS subframes, there will be no strong interference to the MUE, and the MUE can normally measure an original serving cell (i.e., a cell of the macro base station) and maintain a normal connection with the original serving cell.

Referring to FIG. 3, the ABS subframes used by the UE in the coverage area of the femto base station are configured in the following scheme: three ABS subframes are configured for the femto base station, and the positions of these ABS subframes are coordinated at the network side and then notified to the UE, and after the non-member UE falls into the coverage area of the femto base station, the UE is scheduled by the macro base station and measures only in the ABS subframes, and the femto base station transmits only CRS signals in these ABS subframes, thereby effectively avoiding strong interference from the femto base station; and as illustrated in FIG. 3, there is further defined therein configuration modes of ABS subframes used by the UE in a coverage area of the pico base station and in measurement of the pico base station in a coverage area of the macro base station close to the pico base station, and since the UE can access the pico base station and there may be strong interference of the macro base station to the pico base station, the interference problem can be addressed by subframe obviation in the ABS subframes specified on the macro base station as illustrated in FIG. 3 whenever the UE suffers from interference of the macro base station either in the coverage area of the pico base station or in the coverage area of the macro base station.

In the prior art, due to deployment of various heterogeneous network nodes or due to network deployment for avoidance of a blind area, the UE may measure signals of a plurality of cells at the same site, for example, the UE accessing the pico base station detects signals of a plurality of macro base stations, and in another example, the UE accessing the macro base station detects signals of a plurality of femto base stations; and in order to lower the signaling size of ABS configuration signaling sent from the network side to the UE and enable the UE to measure signals of a plurality of cells with use of a common ABS configuration, ABS configurations of the plurality of cells can be required to be kept consistent (that is, kept in synchronization), and as specified in the existing protocol, ABS periodicity configurations between different base stations are transported over an interface connection: and in an FDD system, there is an ABS periodicity configuration of 40 ms, and in a TDD system, ABS periodicity configurations can be set to 20 ms/60 ms/70 ms dependent upon different TDD configurations.

In the existing LTE and LTE-A system, as specified in the protocol, control information carried on PDCCHs (Physical Downlink Control Channels) can only be transmitted in first several OFDM (Orthogonal Frequency Division Multiplexing) symbols of a subframe, and the UE can obtain common information and scheduling information thereof by blind detection among the PDCCH resources, and typically such PDCCH resources are referred to as "legacy PDCCH resources", and an area where they are located is referred to as a "legacy PDCCH area". Along with an increasing demand for scheduling signaling in CA (Carrier Aggregation), CoMP (Coordinated Multi-Point) transmission, enhanced Inter-Cell Interference Coordination (eICIC) and other services, the transmission capacity of the legacy PDCCH area has been becoming saturated, and consequently the PDCCHs need to be enhanced somehow.

An R-PDCCH currently supported in a relayed system is one of PDCCH enhancement solutions. Referring to FIG. 4, taking a carrier in a subframe as an example, in the relayed system, PDCCH resources and PDSCH (Physical Downlink Shared Channel) resources are structured as illustrated in FIG. 4, where an R-PDCCH is configured for the base station to transmit control signaling to the relay, and an R-PDSCH is configured for the relay to transmit data to the UE, and in order to enhance the capacity of PDCCHs in a non-relayed system, the PDCCH enhancement solution in the relayed system can also be introduced to the non-relayed system, that is, the base station spare a part of the PDSCH resources for transmission of data to be used for transmission of control signaling to the UE, and typically such PDCCH resources are referred to as "enhanced PDCCH resources", and an area where they are located is referred to as an enhanced PDCCH area, which is an area of resources for transmission of data.

At present, the legacy PDCCH resources available to an interfering base station and a victim base station have been lowered for interference obviation due to the use of the TDM ICIC mechanism, and this may result in the problem of a limited capacity of the system, and consequently a specific search space has to be extended by the enhanced PDCCHs to thereby ensure the capacity of the system. With the use of the enhanced PDCCH solution, with the TDM ICIC mechanism either supported (that is, ABS subframes are configured at the interfering base station) or not supported, the UE accessing either the interfering base station or the victim base station will detect blindly in PDCCH common and user spaces in the legacy control area and the enhanced control area and demodulate common and specific control information carried on PDCCH without distinguishing between subframes, and this may result in unnecessary power consumption of or unnecessary interference to the UE. Specifically, after the interfering base station is configured with ABS subframes, the UE accessing the interfering base station may only be notified of a measurement limited set (this set is not equivalent to the actually configured set of ABS subframes), and even if the interfering base station does not transmit any control information in the ABS subframes so as to avoid interference, the UE accessing the interfering base station may search common spaces and specific spaces for a legacy PDCCH resource and an enhanced PDCCH resource of all the subframes after being notified of the measurement limited set, and alike an edge UE accessing the victim base station may also detect blindly in common spaces and specific spaces for a legacy PDCCH resource and an enhanced PDCCH resource of all the subframes, and this may result in unnecessary power consumption of the base station and the UE as well as unnecessary interference.

On the other hand, for uplink transmission of data, the base station needs to transmit an ACK/NACK feedback in the downlink, which is carried over a PHICH (Physical Hybrid-ARQ (Automatic Repeat reQuest) Indicator CHannel). For the FDD system, there are both uplink and downlink subframes, there is a PHICH resource in each subframe, and there is a relatively fixed timing relationship of the downlink ACK/NACK feedback with corresponding uplink data. For example, for uplink data transmitted in the n-th subframe, its corresponding ACK/NACK feedback is transmitted in the (n+4)-th downlink subframe. For the TDD system, there are a different number of uplink and downlink subframes in a different TDD subframe configuration, so ACK/NACK feedbacks of a plurality of uplink subframes may possibly be transmitted in the same downlink subframe. For example, for uplink data transmitted in the n-th subframe, its corresponding ACK/NACK feedback is transmitted in the (n+k)-th downlink subframe, where the value of k is set particularly as depicted in Table 1 below. For example, with the TDD uplink and downlink subframe configuration 0, uplink data transmitted in the second subframe has its corresponding ACK/NACK feedback transmitted in the sixth downlink subframe.

TABLE 1

| TDD uplink and downlink subframe configuration | Uplink subframe number | | | | | | | | | |
|---|---|---|---|---|---|---|---|---|---|---|
| | 0 | 1 | 2 | 3 | 4 | 5 | 6 | 7 | 8 | 9 |
| 0 | | | 4 | 7 | 6 | | | 4 | 7 | 6 |
| 1 | | | 4 | 6 | | | | 4 | 6 | |
| 2 | | | 6 | | | | | 6 | | |
| 3 | | | 6 | 6 | 6 | | | | | |
| 4 | | | 6 | 6 | | | | | | |
| 5 | | | 6 | | | | | | | |
| 6 | | | 4 | 6 | 6 | | | 4 | 7 | |

Referring to Table 1 below, with the TDD uplink and downlink subframe configuration 0, if the downlink subframe is configured as an ABS subframe at the interfering base station, then PHICH resources of the uplink subframes 3 and 4 transmitted from the victim base station can be avoided from interference of the interfering base station and thus protected when being transmitted in the downlink subframe 0, but control information carried on PHICH resources of the uplink subframes 3 and 4 transmitted from the interfering base station can not be scheduled because the downlink subframe 0 is configured as an ABS subframe for protection of the victim base station, and this may result in limited uplink transmission of the interfering base station: and in order to avoid this situation from occurring, an enhanced scheduling scheme can be considered for use, for example, multi-frame or cross-subframe scheduling in the uplink, but with the use of the enhanced scheduling scheme, the ABS subframe configuration condition may be unknowable so that PHICH transmission by the interfering base station may not be ensured. Alike for an accessing edge subscriber at the victim base station, uplink transmission may also be limited due to interference, and if an enhanced scheduling scheme is used, for example, multi-frame or cross-subframe scheduling in the uplink, then the ABS subframe configuration condition may be unknowable so that PHICH transmission by the victim base station may not be ensured.

SUMMARY OF THE INVENTION

Embodiments of the invention provide a method of and apparatus for indicating a resource occupancy scheme and processing a resource occupancy scheme indicator so as to enable a UE to be aware of a resource occupancy scheme of a legacy control resource area and an enhanced control resource area to thereby avoid unnecessary power consumption and interference from occurring in a system.

Particular technical solutions according to the embodiments of the invention are as follows:

A method of indicating a resource occupancy scheme includes:

a base station determining downlink subframes to be transmitted and determining respectively a resource occupancy scheme of a legacy control resource area and an enhanced control resource area in each downlink subframe to be transmitted; and the base station generating a resource indicator for the resource occupancy scheme of the legacy control resource area and the enhanced control resource area in each downlink subframe to be transmitted in a specific periodicity and sending the resource indicator to a User Equipment (UE) in a resource indication message to instruct the UE to determine from the obtained resource indicator the resource occupancy scheme of the legacy control resource area and the enhanced control resource area in each downlink subframe to be transmitted in the specific periodicity.

A method of processing a resource occupancy scheme indicator includes:

a User Equipment (UE) receiving a resource indication message, carrying a resource indicator, sent from a base station, wherein the resource indication message is generated by the base station for a resource occupancy scheme of a legacy control resource area and an enhanced control resource area in each downlink subframe to be transmitted in a specific periodicity; and the UE determining from the obtained resource indicator the resource occupancy scheme of the legacy control resource area and the enhanced control resource area in each downlink subframe to be transmitted in the specified periodicity and performing a resource handling mode according to the resource occupancy scheme.

An apparatus for indicating a resource occupancy scheme includes:

a determining unit configured to determine downlink subframes to be transmitted and to determine respectively a resource occupancy scheme of a legacy control resource area and an enhanced control resource area in each downlink subframe to be transmitted; and a communicating unit configured to generate a g resource indicator for the resource occupancy scheme of the legacy control resource area and the enhanced control resource area in each downlink subframe to be transmitted in a specific periodicity and to send the resource indicator to a User Equipment (UE) in a resource indication message to instruct the UE to determine from the obtained resource indicator the resource occupancy scheme of the legacy control resource area and the enhanced control resource area in each downlink subframe to be transmitted in the specific periodicity.

An apparatus for processing a resource occupancy scheme indicator includes:

a communicating unit configured to receive a resource indication message, carrying a resource indicator, sent from a base station, wherein the resource indication message is generated by the base station for a resource occupancy scheme of a legacy control resource area and an enhanced control resource area in each downlink subframe to be transmitted in a specific periodicity; and a performing unit configured to determine from the obtained resource indicator the resource occupancy scheme of the legacy control resource area and the enhanced control resource area in each downlink subframe to be transmitted in the specific periodicity and to perform a resource handling mode according to the resource occupancy scheme.

In the embodiments of the invention, a base station determines downlink subframes to be transmitted, determines respectively a resource occupancy scheme of a legacy control resource area and an enhanced control resource area in each downlink subframe to be transmitted, generates a corresponding resource indicator for the resource occupancy scheme of the legacy control resource area and the enhanced control resource area in each downlink subframe to be transmitted in a specific periodicity, and sends the resource indicator to a UE in a resource indication message, and then the UE determines from the obtained resource indicator the resource occupancy scheme of the legacy control resource area and the enhanced control resource area in each downlink subframe to be transmitted in the specific periodicity and performs a corresponding resource handling mode, where the so-called resource occupancy scheme can be a transmission scheme of control information carried on PDCCH resource or can be a transmission scheme of control information carried on PHICH resource to thereby enable the UE to be aware of that control information carried on PDCCH resource or control information carried on PHICH resource is transmitted from the network side in the legacy control resource area and/or the enhanced control resource area or that control information carried on PDCCH resource or control information carried on PHICH resource is transmitted from the network side neither in the legacy control resource area nor in the enhanced control resource area, so that the UE can blindly detect in PDCCH common and user spaces or receive the PHICH transmission at an accurate position to thereby avoid unnecessary power consumption of and unnecessary interference to the UE due to blind detection or reception and improve effectively the performance of the system.

DETAILED DESCRIPTION OF THE EMBODIMENTS

In a communication system with use of a TDM ICIC mechanism, legacy PDCCH resources available to an interfering base station and a victim base station have been lowered for interference obviation, and in order to avoid the problem of a limited capacity of the system, a search space is extended by extended PDCCHs at the network side to thereby ensure the capacity of the system in embodiments of the invention.

On the other hand, in the communication system with use of the TDM ICIC mechanism, uplink transmission of the interfering base station and the victim base station may have been limited for interference obviation, and in order to ensure uplink service transmission of the system, uplink subframes are scheduled in an enhanced scheduling scheme (for example, a multi-frame or cross-subframe scheduling scheme) in embodiments of the invention. For example, referring to FIG. 5, no uplink subframe can be scheduled in the downlink subframes 2 and 6 configured as ABS subframes, so the uplink subframe 2 is scheduled in the downlink subframe 1.

Figure 1:
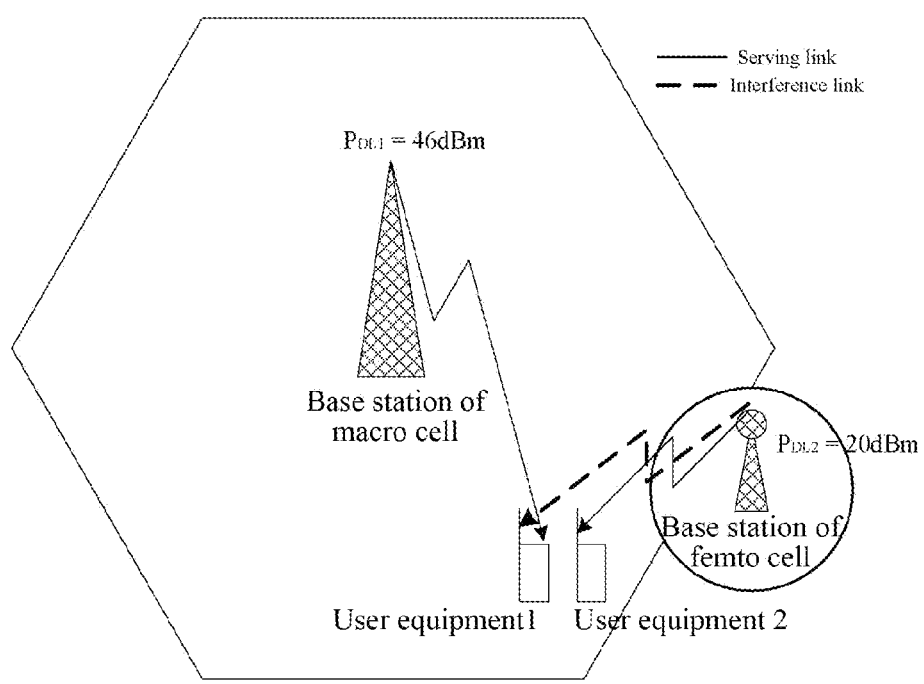
FIG. 1 is a schematic diagram of interference between a macro base station and a low-power base station in the prior art.
Figure 2:
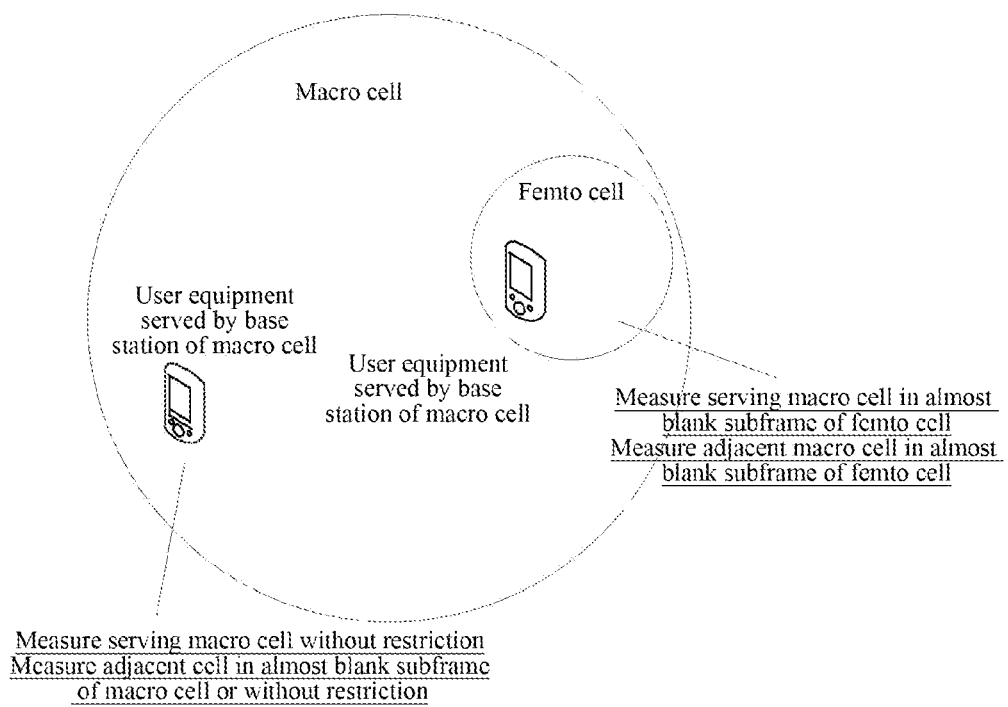
FIG. 2 is a schematic diagram of an application scenario of an ABS subframe configuration in the prior art.
Figure 3:
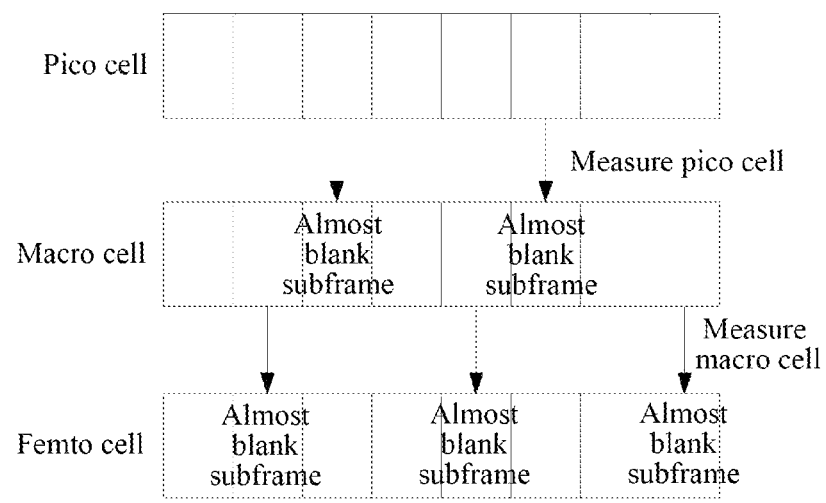
FIG. 3 is a schematic diagram of an ABS subframe configuration in the prior art.
Figure 4:
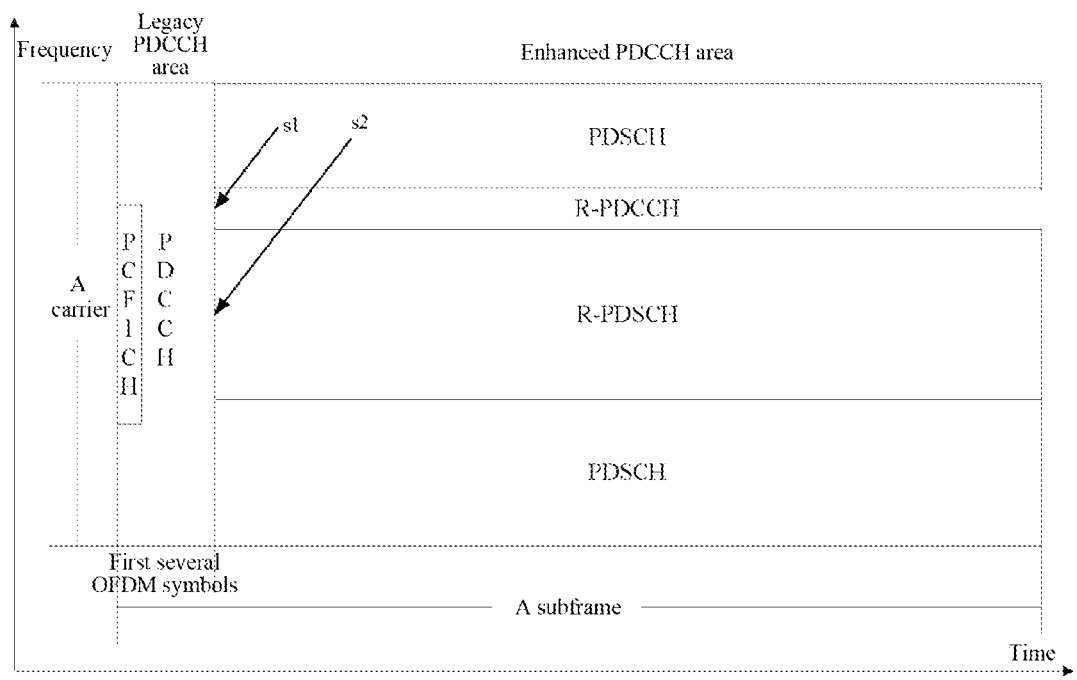
FIG. 4 is a schematic diagram of an enhanced PDCCH configuration in the prior art.
Figure 5:
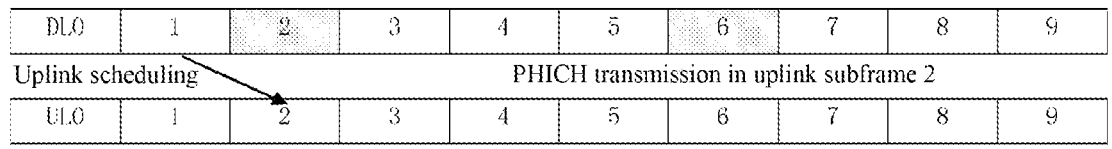
FIG. 5 is a schematic diagram of cross-subframe scheduling in the prior art.
Figure 6:
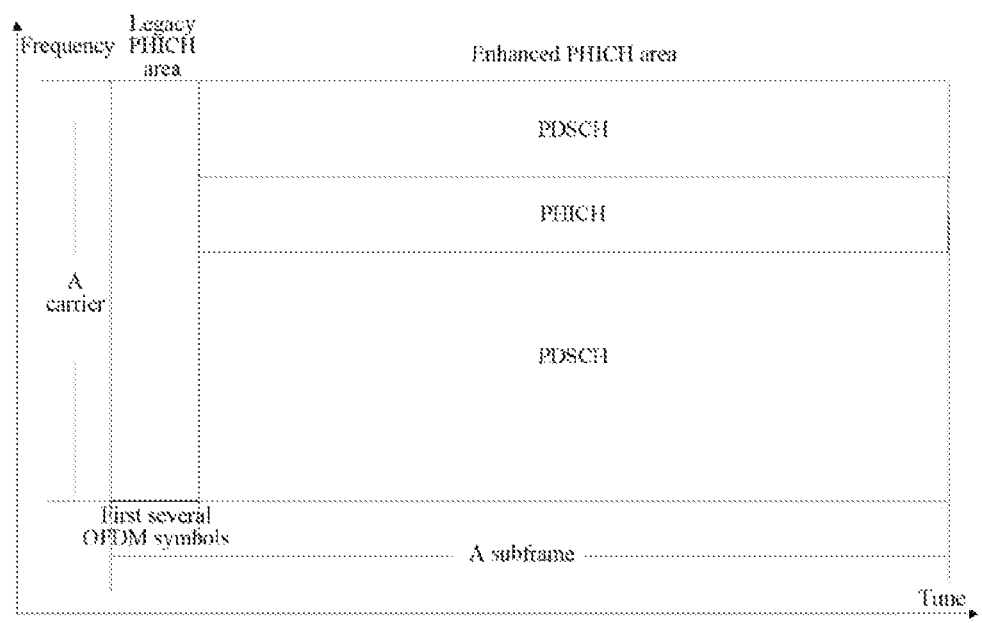
FIG. 6 is a schematic diagram of a first enhanced PHICH configuration in an embodiment of the invention.
Figure 7:
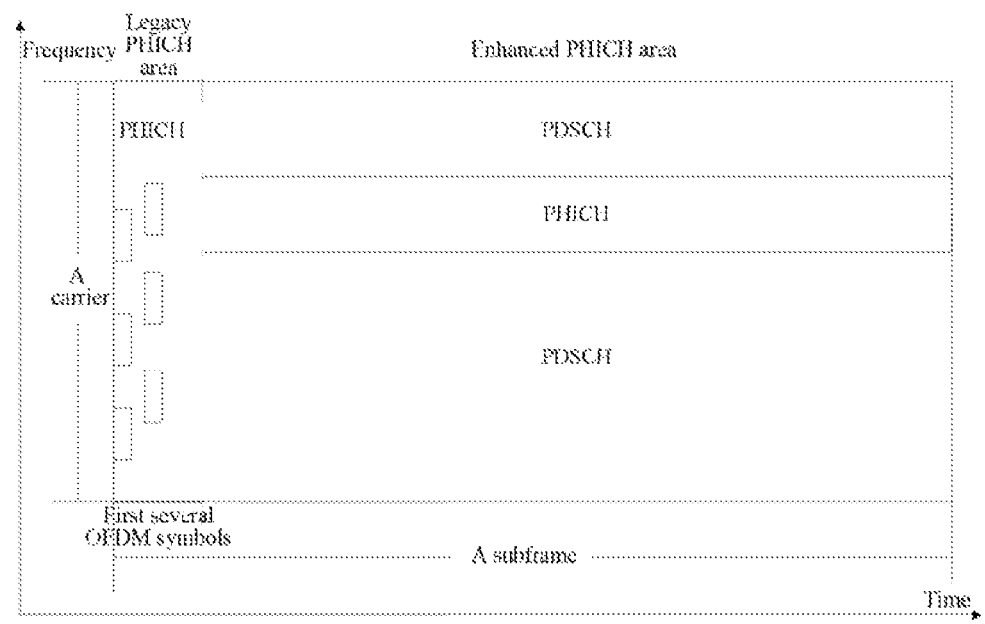
FIG. 7 is a schematic diagram of a second enhanced PHICH configuration in an embodiment of the invention.

In this case, a PHICH resource of a scheduled uplink subframe may possibly occur in a subframe that can not be transmitted, where the so-called subframe that can not be transmitted may be an ABS subframe of an interfering base station. For example, as illustrated in FIG. 5, control information carried on PHICH of the uplink subframe 2 is transmitted in the downlink subframe 6 configured as an ABS subframe, and then the downlink subframe 6 is a subframe that can not be transmitted. Or the so-called subframe that can not be transmitted can alternatively be an unprotected subframe of a victim base station (that is, a victim subframe). In view of this case, in this embodiment, in order to avoid interference to the victim base station, legacy PHICH area will not be used for transmission of data, but a part of PDSCH resources are spared for PHICHs transmission of, that is, PHICH resources are put in a PDSCH area for transmission, and such PHICH resources are referred to as enhanced PHCIH resources, and an area where they are located is referred to as an enhanced PHICH area. For example, referring to FIG. 5 and FIG. 6, the uplink subframe 2 is scheduled, and control information carried on the PHICH of the uplink subframe 2 needs to be transmitted in the downlink subframe 6, but the downlink subframe 6 is configured as an ABS subframe, and at this time, in order to avoid interference to the victim base station, legacy PHICH area will not be used for transmission of data, and then in order to ensure timely PHICH transmission, the PHICH of the downlink subframe 2 is put in the PDSCH area for transmission. However in this process, if all of uplink transmission is concentrated in an uplink subframe that can be scheduled (that is, neither uplink subframe that can be scheduled, corresponding to an ABS subframe configured for downlink transmission, nor uplink subframe that can be scheduled, corresponding to a subframe for which downlink transmission is unprotected, can be scheduled), then a larger number of control information carried on PHICH resources are transmitted in the uplink subframe that can be scheduled, and at this time, due to a limited capacity of the legacy PHICH area, PHICH resources can be further placed in both the legacy PHICH area and the enhanced PHICH area for transmission, particularly as illustrated in FIG. 7.

As can be apparent from the foregoing two application scenarios, in this embodiment, control information carried on PDCCH resource or control information carried on PHICH resource can be transmitted from the network side in both a legacy control resource area and an enhanced control resource area, where the so-called legacy control resource area can be a legacy PDCCH area or can be a legacy PHICH area, and the legacy PDCCH area and the legacy PHICH area can be the same physical resource area or can be different physical resource areas in a practical application and will be referred collectively to as a legacy control resource area in this embodiment; and alike the so-called enhanced control resource area can be an enhanced PDCCH area or can be an enhanced PHICH area, and the enhanced PDCCH area and the enhanced PHICH area can be the same physical resource area or can be different physical resource areas in a practical application and will be referred collectively to as an enhanced control resource area in this embodiment.

However a UE may not know a resource transmission mode but has to detect blindly a PDCCH resource in legacy control resource areas and enhanced control resource areas of all the subframes or receive blindly a PHICH in the legacy control resource area and the enhanced control resource area of all the subframes, and this may result in unnecessary power consumption and unnecessary interference.

In view of this, in an embodiment of the invention, dedicated signaling is configured at the network side to notify the UE of a resource occupancy scheme at the network side so as to enable the UE to receive purposefully control information carried on a resource transmitted from the network side at an accurate position while avoiding unnecessary power consumption.

Preferred embodiments of the invention will be described below in details with reference to the drawings.

Figure 8:
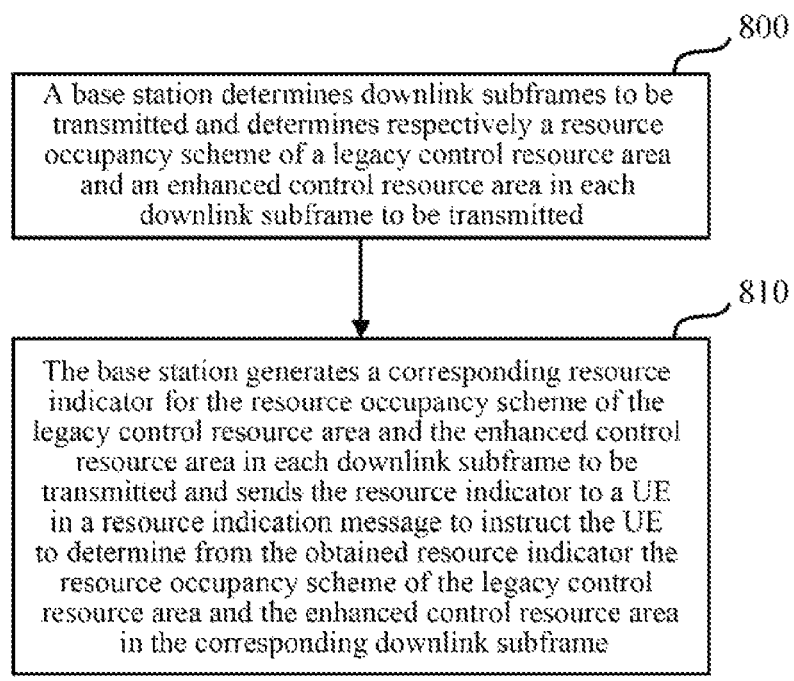
FIG. 8 is a flow chart of a base station notifying a UE of a resource occupancy scheme of an embodiment of the invention.

Referring to FIG. 8 in this embodiment, a detailed flow of the network side notifying a UE of a resource occupancy scheme is as follows:

Step 800: A base station determines downlink subframes to be transmitted and determines respectively a resource occupancy scheme of a legacy control resource area and an enhanced control resource area in each downlink subframe to be transmitted.

In this embodiment, for any downlink subframe, the resource occupancy scheme determined by the base station can be a PUCCH resource occupancy scheme of the legacy control resource area and the enhanced control resource area in the downlink subframe or can be a PHICH resource occupancy scheme of the legacy control resource area and the enhanced control resource area in the downlink subframe.

In this embodiment, before the step 800 is performed, it can be determined in a system whether to allow a PHICH transmission to a UE in an enhanced control resource area, that is, the base station can pre-determine whether to allow a local PHICH transmission only in an enhanced control resource area or a PHICH transmission in both a legacy control resource area and an enhanced control resource area, and thus with the use of an enhanced scheduling scheme in the system with a TDM ICIC mechanism, limited transmission of the system or a limited capacity of the system can be avoided to thereby improve the performance of the system.

Step 810: The base station generates a corresponding resource indicator for the resource occupancy scheme of the legacy control resource area and the enhanced control resource area in each downlink subframe to be transmitted and sends the resource indicator to a UE in a resource indication message to instruct the UE to determine from the obtained resource indicator the resource occupancy scheme of the legacy control resource area and the enhanced control resource area in the corresponding downlink subframe.

In this embodiment, the resource indicator sent from the base station can be UE-specific RRC (Radio Resource Control) signaling or broadcast signaling.

In this embodiment, when the step 810 is performed, the base station can instruct the UE to determine from the obtained resource indicator that control information is transmitted from the network side neither in the legacy control resource area nor in the enhanced control resource area, or that control information is transmitted from the network side in the legacy control resource area and/or the enhanced control resource area, respectively in each downlink subframe to be transmitted in a specific periodicity, where the so-called control information refers to control information carried on PDCCH resource or control information carried on PHICH resource.

In this step, when the step 810 is performed, the base station sends the resource indicator in the resource indication message in the following approaches but without limitation thereto:

In a first sending approach, the base station sends a first resource sub-indicator to the UE in UE-specific RRC signaling or broadcast signaling to notify the UE of various configured resource occupancy schemes, and sends a second resource sub-indicator to the UE in UE-specific RRC signaling or broadcast signaling to notify the UE of the resource occupancy scheme corresponding to each downlink subframe to be transmitted in the specific periodicity, where the downlink subframes to be transmitted in the specific periodicity can be a part or all of the downlink subframes to be transmitted, which are determined in the step 800; and the base station can send firstly the first resource sub-indicator and then the second resource sub-indicator or can send firstly the second resource sub-indicator and then the first resource sub-indicator or can sent both of them synchronously. Of course, the base station can further update the first resource sub-indicator and the second resource sub-indicator separately or can update both of them collectively so that the UE performs a subsequent operation according to the lastly received first resource sub-indicator and second resource sub-indicator.

Particularly when the base station sends the first resource sub-indicator and the second resource sub-indicator in RRC signaling, the first resource sub-indicator can be a 2-bit normal indicator, and the second resource sub-indicator can be a set of time patterns of the downlink subframes to be transmitted in the specific periodicity. When the base station sends the first resource sub-indicator and the second resource sub-indicator broadcast signaling, the first resource sub-indicator can be 2-bit SIB (System Information Block) information, and the second resource sub-indicator can be a set of time patterns of the downlink subframes to be transmitted in the specific periodicity.

For example, when the base station notifies the UE of the PDCCH resource occupancy scheme, the base station carries a 2-bit normal indicator in UE-specific RRC signaling in the area of a cell or carries 2-bit SIB information in broadcast signaling to notify the user of the configured resource occupancy schemes particularly as follows:

When the 2-bit first resource indicator takes the value of 00, it indicates that control information carried on PDCCH resource will be transmitted from the network side only in the legacy control resource area in a downlink subframe with a time pattern of 1 or 0 (that is, any downlink subframe in the specific periodicity, which will also apply below), that is, the UE only needs to detect blindly in PDCCH common and user spaces in the legacy control resource area;

When the 2-bit first resource indicator takes the value of 01, it indicates that control information carried on PDCCH resource will be transmitted from the network side in both the legacy control resource area and the enhanced control resource area in a downlink subframe with a time pattern of 1 or 0, that is, the UE can detect blindly in PDCCH common and user spaces in the legacy control resource area and the enhanced control resource area;

When the 2-bit first resource indicator takes the value of 10, it indicates that control information carried on PDCCH resource will be transmitted from the network side in the legacy control resource area and the enhanced control resource area in a downlink subframe with a time pattern of 1, and control information carried on PDCCH resource will be transmitted from the network side only in the legacy control resource area in a downlink subframe with a time pattern of 0, that is, the UE can detect blindly in PDCCH common and user spaces in the legacy control resource area and the enhanced control resource area in the downlink subframe with a time pattern of 1 and detect blindly in PDCCH common and user spaces only in the legacy control resource area in the downlink subframe with a time pattern of 0: and When the 2-bit first resource indicator takes the value of 11, it indicates that control information carried on PDCCH resource will be transmitted from the network side in the legacy control resource area and the enhanced control resource area in a downlink subframe with a time pattern of 1, and control information carried on PDCCH resource will not be transmitted from the network side in a downlink subframe with a time pattern of 0, that is, the UE can detect blindly in PDCCH common and user spaces in the legacy control resource area and the enhanced control resource area in the downlink subframe with a time pattern of 1 and will not detect blindly in PDCCH common and user spaces in the downlink subframe with a time pattern of 0.

Next the base station carries the set of time patterns in UE-specific RRC signaling or broadcast signaling to notify the UE of the resource occupancy scheme corresponding to each downlink subframe in the specific periodicity: and particularly the base station notifies in a bitmap the UE of the set of time patterns of the respective downlink subframes in the specific periodicity. For example, in an FDD system, the set of time patterns includes 40 bits, each of which represents a time pattern of a downlink subframe in the specific periodicity, that is, 40 downlink subframes are counted as a specific periodicity; and in a TDD system, with the uplink and downlink subframe configuration numbered 0, the set of time patterns includes 70 bits, with the uplink and downlink subframe configurations numbered 1 to 5, the set of time patterns includes 20 bits, and with the uplink and downlink subframe configuration numbered 6, the set of time patterns includes 60 bits. Of course the specific periodicity above can alternatively be set to another value, that is, the number of bits included in the set of time patterns can alternatively be another value, and the foregoing disclosure is merely exemplary.

In another example, when the base station notifies the UE of the PHICH resource occupancy scheme, the base station carries a 2-bit normal indicator in UE-specific RRC signaling in the area of a cell or carries 2-bit SIB information in broadcast signaling to notify the user of the configured resource occupancy schemes particularly as follows:

When the 2-bit first resource indicator takes the value of 00, it indicates that control information carried on PHICH resource will be transmitted from the network side only in the legacy control resource area in a downlink subframe with a time pattern of 1 or 0 (that is, any downlink subframe in the specific periodicity, which will also apply below);

When the 2-bit first resource indicator takes the value of 01, it indicates that control information carried on PHICH resource will be transmitted from the network side in both the legacy control resource area and the enhanced control resource area in a downlink subframe with a time pattern of 1 or 0;

When the 2-bit first resource indicator takes the value of 10, it indicates that control information carried on PHICH resource will be transmitted from the network side in the legacy control resource area and the enhanced control resource area in a downlink subframe with a time pattern of 1, and control information carried on PHICH resource will be transmitted from the network side only in the legacy control resource area in a downlink subframe with a time pattern of 0; and When the 2-bit first resource indicator takes the value of 11, it indicates that control information carried on PHICH resource will be transmitted from the network side in the legacy control resource area and the enhanced control resource area in a downlink subframe with a time pattern of 1, and control information carried on PHICH resource will not be transmitted from the network side in a downlink subframe with a time pattern of 0.

Next the base station carries the set of time patterns in UE-specific RRC signaling or broadcast signaling to notify the UE of the resource occupancy scheme corresponding to each downlink subframe in the specific periodicity: and particularly the base station notifies in a bitmap the UE of the set of time patterns of the respective downlink subframes in the specific periodicity. In an FDD system, the set of time patterns includes 40 bits, each of which represents a time pattern of a downlink subframe in the specific periodicity, that is, 40 downlink subframes are counted as a specific periodicity; and in a TDD system, with the uplink and downlink subframe configuration numbered 0, the set of time patterns includes 70 bits, with the uplink and downlink subframe configurations numbered 1 to 5, the set of time patterns includes 20 bits, and with the uplink and downlink subframe configuration numbered 6, the set of time patterns includes 60 bits. Of course the specific periodicity above can alternatively be set to another value, that is, the number of bits included in the set of time patterns can alternatively be another value, and the foregoing disclosure is merely exemplary.

In a second approach, the base station sends a third resource sub-indicator to the UE in UE-specific RRC signaling or broadcast signaling to notify the UE of a resource occupancy scheme of the legacy control resource area in each downlink subframe in the specific periodicity; and The base station sends a fourth resource sub-indicator to the UE in UE-specific RRC signaling or broadcast signaling to notify the UE of a resource occupancy scheme of the enhanced control resource area in each downlink subframe in the specific periodicity.

Particularly both the third resource sub-indicator and the fourth resource sub-indicator can be a set of time patterns of the downlink subframes in the specific periodicity; and the base station can send firstly the third resource sub-indicator and then the fourth resource sub-indicator or can send firstly the fourth resource sub-indicator and then the third resource sub-indicator or can sent both of them synchronously. Of course, the base station can further update the third resource sub-indicator and the fourth resource sub-indicator separately or can update both of them collectively so that the UE performs a subsequent operation according to the lastly received third resource sub-indicator and fourth resource sub-indicator.

For example, when the base station notifies the UE of the PDCCH resource occupancy scheme, the base station notifies the UE of a first set of time patterns in RRC signaling or broadcast signaling, where the first set of time patterns includes a time pattern, in the legacy control resource area, corresponding to each downlink subframe in the specific periodicity to notify the UE of whether control information carried on PDCCH resource will be transmitted from the network side in the legacy control resource area in each downlink subframe, that is, whether the UE needs to detect blindly in PDCCH common and user spaces in the legacy control resource area in each downlink subframe, and where each bit in the first set of time patterns corresponds to a downlink subframe, and if the bit takes the value of 1, then it indicates that control information carried on PDCCH resource will be transmitted from the network side in the legacy control resource area in the corresponding downlink subframe, or if the bit takes the value of 0, then it indicates that control information carried on PDCCH resource will be not transmitted from the network side in the legacy control resource area in the corresponding downlink subframe; and the base station notifies the UE of a second set of time patterns in RRC signaling or broadcast signaling, where the second set of time patterns includes a time pattern, in the enhanced control resource area, corresponding to each downlink subframe in the specific periodicity to notify the UE of whether control information carried on PDCCH resource will be transmitted from the network side in the enhanced control resource area in each downlink subframe, that is, whether the UE needs to detect blindly in PDCCH common and user spaces in the enhanced control resource area in each downlink subframe, and where each bit in the second set of time patterns corresponds to a downlink subframe, and if the bit takes the value of 1, then it indicates that control information carried on PDCCH resource will be transmitted from the network side in the enhanced control resource area in the corresponding downlink subframe, or if the bit takes the value of 0, then it indicates that control information carried on PDCCH resource will be not transmitted from the network side in the enhanced control resource area in the corresponding downlink subframe. The specific periodicity can be set as follows: in an FDD system, the set of time patterns includes 40 bits, each of which represents a time pattern of a downlink subframe in the specific periodicity, that is, 40 downlink subframes are counted as a specific periodicity; and in a TDD system, with the uplink and downlink subframe configuration numbered 0, a set of time patterns includes 70 bits, with the uplink and downlink subframe configurations numbered 1 to 5, a set of time patterns includes 20 bits, and with the uplink and downlink subframe configuration numbered 6, a set of time patterns includes 60 bits. Of course the specific periodicity above can alternatively be set to another value, that is, the number of bits included in the set of time patterns can alternatively be another value, and the foregoing disclosure is merely exemplary.

For example, when the base station notifies the UE of the PHICH resource occupancy scheme, the base station notifies the UE of a first set of time patterns in RRC signaling or broadcast signaling, where the first set of time patterns includes a time pattern, in the legacy control resource area, corresponding to each downlink subframe in the specific periodicity to notify the UE of whether control information carried on PHICH resource will be transmitted from the network side in the legacy control resource area in each downlink subframe, and where each bit in the first set of time patterns corresponds to a downlink subframe, and if the bit takes the value of 1, then it indicates that control information carried on PHICH resource will be transmitted from the network side in the legacy control resource area in the corresponding downlink subframe, or if the bit takes the value of 0, then it indicates that control information carried on PHICH resource will be not transmitted from the network side in the legacy control resource area in the corresponding downlink subframe; and the base station notifies the UE of a second set of time patterns in RRC signaling or broadcast signaling, where the second set of time patterns includes a time pattern, in the enhanced control resource area, corresponding to each downlink subframe in the specific periodicity to notify the UE of whether control information carried on PHICH resource will be transmitted from the network side in the enhanced control resource area in each downlink subframe, where each bit in the second set of time patterns corresponds to a downlink subframe, and if the bit takes the value of 1, then it indicates that control information carried on PHICH resource will be transmitted from the network side in the enhanced control resource area in the corresponding downlink subframe, or if the bit takes the value of 0, then it indicates that control information carried on PHICH resource will be not transmitted from the network side in the enhanced control resource area in the corresponding downlink subframe. The specific periodicity can be set as follows: in an FDD system, the set of time patterns includes 40 bits, each of which represents a time pattern of a downlink subframe in the specific periodicity, that is, 40 downlink subframes are counted as a specific periodicity; and in a TDD system, with the uplink and downlink subframe configuration numbered 0, a set of time patterns includes 70 bits, with the uplink and downlink subframe configurations numbered 1 to 5, a set of time patterns includes 20 bits, and with the uplink and downlink subframe configuration numbered 6, a set of time patterns includes 60 bits. Of course the specific periodicity above can alternatively be set to another value, that is, the number of bits included in the set of time patterns can alternatively be another value, and the foregoing disclosure is merely exemplary.

Based upon the foregoing embodiment, in an embodiment of the invention, the base station needs to configure resource occupancy schemes of respective downlink subframes by setting the corresponding resource occupancy schemes dependent upon different attributes of the downlink subframes and a practical application scenario, where the base station configures the resource occupancy scheme of any downlink subframe by exchanging occupancy information of frequency resources with an other base station in an interference relationship so that the base station and the other base station transmit control information carried on PDCCH resource or control information carried on PHICH resource over different frequency resources in the enhanced control resource area of the corresponding downlink subframe.

By way of an example in which the resource occupancy scheme of any downlink subframe is configured, if the base station configures the resource occupancy scheme of a PDCCH resource, then the base station (which may be an interfering base station or can be a victim base station) will transmit control information carried on PDCCH resource in both an ABS subframe and a normal subframe in the case of a high service demand, so in the configuration process, the base station shall determine whether a downlink subframe to be configured currently is an ABS subframe, and if it is a non-ABS subframe, i.e., a normal subframe, then the base station performs scheduling as in the prior art and also configures the resource occupancy scheme as follows: control information carried on PDCCH resource is transmitted in the legacy control resource area and/or the enhanced control resource area; or if it is an ABS subframe, then the base station configures the resource occupancy scheme as follows in order to avoid interference to an other base station: control information carried on PDCCH resource is not transmitted in the legacy control resource area, that is, control information is not transmitted in the legacy control resource area, and control information carried on PDCCH resource is transmitted in the enhanced control resource area, that is, control information is transmitted in the enhanced control resource area.

Furthermore, in order to avoid interference to an other base station due to PDCCH transmission in the enhanced control resource area, the base station needs to exchange in advance frequency occupancy information of PDCCH resources in the enhanced control resource area with the other base station and configures the resource occupancy scheme of the downlink subframe so that a frequency resource configured in the enhanced control resource area to transmit control information carried on PDCCH resource is different from a frequency resource used in the enhanced control resource area for the other base station to transmit control information carried on PDCCH resource, where the granularity of the so-called frequency resource can be a PRB (Physical Resource Block). Particularly:

If there are an interfering base station, referred to as a base station A, and a victim base station, referred to as a base station B, then when the base station A and the B transmit control information carried on PDCCH resources in the enhanced control resource area in an ABS subframe or a normal subframe, the base station A and the base station B exchange frequency position information of the PDCCH resources in the enhanced control resource area with each other. For example, the base station A transmits control information carried on PDCCH resource in the enhanced control resource area in consecutive PRBs 0-16 in an ABS subframe and notifies the base station B of the start and end sequence numbers of the PRBs in interaction signaling via an X2 interface, and the base station B will reserve PRBs 0 to 16 in a downlink subframe corresponding to the ABS subframe not to be allocated to an edge victim UE for transmission of control information and data; and in another example, bandwidth occupied PRB groups are numbered, and the base station A uses a PRB group numbered 0 in a normal subframe and notifies the base station B of the PRB group number 0 in interaction signaling via an X2 interface, and the base station B will reserve a PRB group number 0 in a downlink subframe corresponding to the normal subframe not to be allocated to an edge victim UE for transmission of control information and data, where the base stations A and B exchange frequency resource occupancy information of the PDCCH resources in the enhanced control resource area, possibly in an exchange approach similar to an RNTP indicator at the granularity of typically a PRB group or possibly a carrier in the case of multiple carriers, for example, if an occupied PRB group or carrier is flagged with 1, then it indicates high control channel interference of the opposite party at this position, or if the occupied PRB group or carrier is flagged with 0, then it indicates another situation.

In another example in which the resource occupancy scheme of any downlink subframe is configured, if the base station configures the resource occupancy scheme of a PHICH resource, then the base station (which may be an interfering base station or can be a victim base station) will transmit control information carried on PHICH resource in both an ABS subframe and a normal subframe in the case of a high service demand, so in the configuration process, the base station shall determine whether a downlink subframe to be configured currently is an ABS subframe, and if it is a non-ABS subframe, i.e., a normal subframe, then the base station performs scheduling as in the prior art and also configures the resource occupancy scheme as follows: control information carried on PHICH resource is transmitted in the legacy control resource area and/or the enhanced control resource area; or if it is an ABS subframe, then the base station configures the resource occupancy scheme as follows in order to avoid interference to an other base station: control information carried on PHICH resource is not transmitted in the legacy control resource area, that is, control information is not transmitted in the legacy control resource area, and control information carried on PHICH resource is transmitted in the enhanced control resource area, that is, control information is transmitted in the enhanced control resource area.

Furthermore, in order to avoid interference to an other base station due to PHICH transmission in the enhanced control resource area, the base station needs to exchange in advance frequency occupancy information of PHICH resources in the enhanced control resource area with the other base station and configures the resource occupancy scheme of the downlink subframe so that a frequency resource configured in the enhanced control resource area to transmit control information carried on PHICH resource is different from a frequency resource used in the enhanced control resource area for the other base station to transmit control information carried on PHICH resource, where the granularity of the so-called frequency resource can be a PRB (Physical Resource Block). Particularly:

If there are an interfering base station, referred to as a base station A, and a victim base station, referred to as a base station B, then when the base station A and the B transmit control information carried on PHICH resources in the enhanced control resource area in an ABS subframe or a normal subframe, the base station A and the base station B exchange frequency position information of the PHICH resources in the enhanced control resource area with each other. For example, the base station A transmits control information carried on PHICH resource in the enhanced control resource area in consecutive PRBs 0-16 in an ABS subframe and notifies the base station B of the start and end sequence numbers of the PRBs in interaction signaling via an X2 interface, and the base station B will reserve PRBs 0 to 16 in a downlink subframe corresponding to the ABS subframe not to be allocated to an edge victim UE for transmission of control information and data; and in another example, bandwidth occupied PRB groups are numbered, and the base station A uses a PRB group numbered 0 in a normal subframe and notifies the base station B of the PRB group number 0 in interaction signaling via an X2 interface, and the base station B will reserve a PRB group number 0 in a downlink subframe corresponding to the normal subframe not to be allocated to an edge victim UE for transmission of control information and data, where the base stations A and B exchange frequency resource occupancy information of the PHICH resources in the enhanced control resource area, possibly in an exchange approach similar to an RNTP indicator at the granularity of typically a PRB group or possibly a carrier in the case of multiple carriers, for example, if an occupied PRB group or carrier is flagged with 1, then it indicates high control channel interference of the opposite party at this position, or if the occupied PRB group or carrier is flagged with 0, then it indicates another situation; and in another example, if an occupied PRB group or carrier is flagged with 11, then it indicates high-level interference of the opposite party at this position due to the PHICH resource, or if the occupied PRB group or carrier is flagged with 10, then it indicates medium-level interference of the opposite party at this position due to the PHICH resource, or if the occupied PRB group or carrier is flagged with 01, then it indicates low-level interference of the opposite party at this position due to the PHICH resource, or if the occupied PRB group or carrier is flagged with 00, then it indicates control information not transmitted on PHICH resource.

The implementations have been described in the foregoing respective embodiments all in a single-carrier application scenario, but in a practical application, there is also a carrier aggregation scenario in which each subframe to be transmitted relates to respective frequency resources including multiple carriers, in other words, there are several subframes to be transmitted in a corresponding specific periodicity over each carrier, and then the base station can send a resource occupancy scheme of the network side to the UE in the carrier aggregation scenario in the following two approaches:

In a first approach, the base station sends, in a resource indication message respectively over each component carrier, to the UE a resource occupancy scheme of the legacy control resource area and the enhanced control resource area in each downlink subframe to be transmitted in a specific periodicity over the corresponding carrier.

For example, the base station aggregates two component carriers, referred to respectively as a CC1 and a CC2, and then the base station sends, in RRC signaling or broadcast signaling, over the CC1, to the UE a resource indicator corresponding to a resource occupancy scheme (a PDCCH resource or a PHICH resource) in the legacy control resource area and the enhanced control resource area in each downlink subframe to be transmitted in a specific periodicity over the CC1; and sends, in RRC signaling or broadcast signaling, over the CC2, to the UE a resource indicator corresponding to a resource occupancy scheme (a PDCCH resource or a PHICH resource) in the legacy control resource area and the enhanced control resource area in each downlink subframe to be transmitted in a specific periodicity over the CC2.

In a second approach, the base station sends, in a resource indication message over a primary carrier, to the UE a resource indicator corresponding to a resource occupancy scheme of the legacy control resource area and the enhanced control resource area in each downlink subframe to be transmitted in a specific periodicity over respective carriers.

For example, the base station aggregates four component carriers, referred respectively as a CC1, a CC2, a CC3 and a CC4, and then:

The base station sends, in RRC signaling or broadcast signaling, over the CC1, to the UE a resource indicator corresponding to a resource occupancy scheme of the legacy control resource area and the enhanced control resource area in each downlink subframe to be transmitted in a specific periodicity over the respective CC1, CC2, CC3 and CC4, where the resource indicator can be SIB information or a normal indicator, for example, the resource indicator of the four component carriers is {00, 01, 10, 11} respectively, where 00 represents no control information transmitted, 01 represents blind detection in the legacy area, 10 represents blind detection in the enhanced area, and 11 represents blind detection in the legacy and enhanced areas; or the resource indicator can alternatively be a set of time patterns, for example, the resource indicator of the four component carriers is {pattern 1, pattern 2, pattern 3, pattern 4} respectively to indicate time patterns used over the respective component carriers to transmit control information carried on PDCCH resource or control information carried on PHICH resource in the legacy control resource area or the enhanced legacy control resource area respectively.

Figure 9:
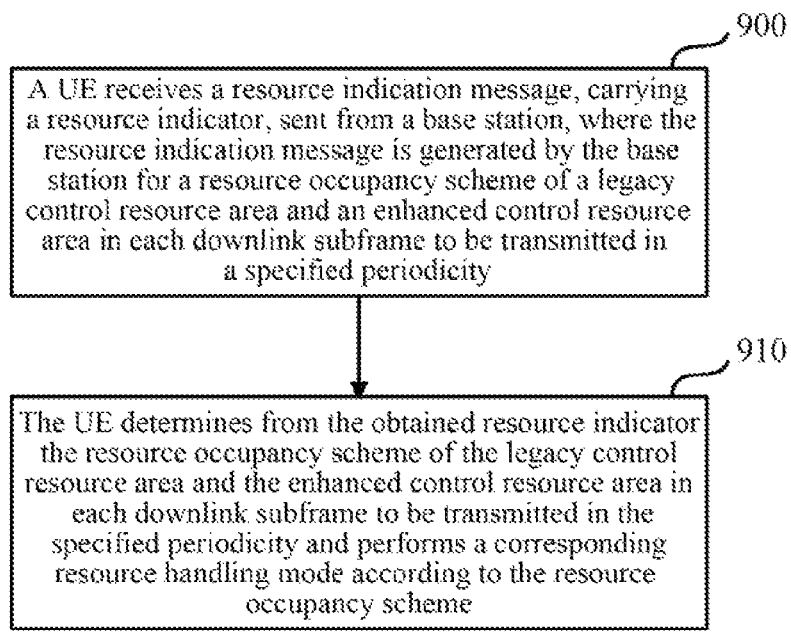
FIG. 9 is a flow chart of a UE performing a resource handling mode in response to an obtained resource occupancy scheme of an embodiment of the invention.

Based upon the foregoing embodiments, after the base station notifies the resource occupancy scheme of the network side, the UE also needs to perform a corresponding process according to the obtained resource occupancy scheme, and a particular flow thereof is as illustrated in FIG. 9:

Step 900: A UE receives a resource indication message, carrying a resource indicator, sent from a base station, where the resource indication message is generated by the base station for a resource occupancy scheme of a legacy control resource area and an enhanced control resource area in each downlink subframe to be transmitted in a specific periodicity.

In this embodiment, the resource indication message is UE-specific RRC signaling or broadcast signaling. The resource occupancy scheme determined by the UE is a PDCCH resource occupancy scheme or a PHICH resource occupancy scheme.

Step 910: The UE determines from the obtained resource indicator the resource occupancy scheme of the legacy control resource area and the enhanced control resource area in each downlink subframe to be transmitted in the specific periodicity and performs a corresponding resource handling mode according to the resource occupancy scheme.

In this embodiment, when the step 910 is performed, the UE determines from the obtained resource indicator that control information is transmitted from the network side neither in the legacy control resource area nor in the enhanced control resource area, or that control information is transmitted from the network side in the legacy control resource area and/or the enhanced control resource area, respectively in each downlink subframe to be transmitted in the specific periodicity, where the so-called control information refers to control information carried on PDCCH resource or control information carried on PHICH resource.

The UE performs a corresponding resource handling mode according to the determined resource occupancy scheme as follows:

The UE detects blindly in PDCCH common and user spaces in the legacy control resource area and/or the enhanced control resource area, or does not detect blindly in PDCCH common and user spaces in the legacy control resource area and the enhanced control resource area, according to the determined resource occupancy scheme;

Or

The UE receives a PHICH resource in the legacy control resource area and/or the enhanced control resource area, or does not receive a PHICH resource in the legacy control resource area and the enhanced control resource area, according to the determined resource occupancy scheme.

In the foregoing embodiment, when the step 900 is performed, the UE receives a resource indication message, carrying a first resource sub-indicator, sent from the base station and determines configured resource occupancy schemes from the first resource sub-indicator, and receives a resource indication message, carrying a second resource sub-indicator, sent from the base station and determines from the second resource sub-indicator the resource occupancy scheme corresponding to each downlink subframe to be transmitted in the specific periodicity, where the UE can receive the first resource sub-indicator and the second resource sub-indicator separately or jointly and perform a subsequent operation according to the lastly received first resource sub-indicator and second resource sub-indicator, and reference can be made to the relevant description of the base station side for particular configuration contents of the first resource sub-indicator and the second resource sub-indicator, so a repeated description thereof will be omitted here.

Or when the step 900 is performed, the UE receives a resource indication message, carrying a third resource sub-indicator, sent from the base station and determines from the third resource sub-indicator a resource occupancy scheme of the legacy control resource area in each downlink subframe to be transmitted in the specific periodicity, and receives a resource indication message, carrying a fourth resource sub-indicator, sent from the base station and determines from the fourth resource sub-indicator a resource occupancy scheme of the enhanced control resource area in each downlink subframe to be transmitted in the specific periodicity, where the UE can receive the third resource sub-indicator and the fourth resource sub-indicator separately or jointly and perform a subsequent operation according to the lastly received third resource sub-indicator and the fourth resource sub-indicator, and reference can be made to the relevant description of the base station side for particular configuration contents of the third resource sub-indicator and the fourth resource sub-indicator, so a repeated description thereof will be omitted here.

In this embodiment, the UE determines the base station to transmit control information carried on PDCCH resource or control information carried on PHICH resource in the enhanced control resource area of a downlink subframe by determining from higher-layer control information or other control signaling the particular frequency position of the PDCCH resource or the PHICH resource in the enhanced control resource area.

For example, for any downlink subframe, if the UE determines from the received resource indicator that the base station transmits control information carried on PDCCH resource neither in the legacy control resource area nor in the enhanced control resource area in the downlink subframe, that is, the base station does not transmit any control information in the downlink subframe, then the UE does not detect blindly in PDCCH common and user spaces in the legacy control resource area and the enhanced control resource area in the downlink subframe, or if the UE determines from the received resource indicator that the base station transmits control information carried on PDCCH resource in the legacy control resource area and/or the enhanced control resource area in the downlink subframe, then the UE detects blindly in PDCCH common and user spaces in the legacy control resource area and/or the enhanced control resource area in the downlink subframe; and furthermore if the UE determines from system information that there is no multi-carrier scheduling, cross-subframe scheduling and SPS (Semi-Persistent Scheduling), then the UE does not receive any data in the downlink subframe, and on the other hand, the UE can determine from higher-layer control information or other control information the particular position of a frequency resource occupied for PDCCH transmission in the enhanced control resource area.

In another example, for any downlink subframe, if the UE determines from the received resource indicator that the base station does not transmit control information carried on PHICH resource in the legacy control resource area and the enhanced control resource area in the downlink subframe, that is, the base station does not transmit an ACK/NACK feedback any uplink subframe in the downlink subframe, then the UE does not receive control information carried on PHICH resource in the legacy control resource area and the enhanced control resource area in the downlink subframe, or if the UE determines from the received resource indicator that the base station transmits control information carried on PHICH resource in the legacy control resource area and/or the enhanced control resource area in the downlink subframe, then the UE receives control information carried on the PHICH resource in the legacy control resource area and/or the enhanced control resource area in the downlink subframe; and on the other hand, the UE can determine from higher-layer control information or other control information the particular position of a frequency resource occupied for transmission of control information carried on the PHICH resource in the enhanced control resource area.

The implementations have been described in the foregoing respective embodiments all in a single-carrier application scenario, but in a practical application, there is also a carrier aggregation scenario in which the UE receives, in a resource indication message sent over each component carrier respectively, a resource indicator corresponding to a resource occupancy scheme of the legacy control resource area and the enhanced control resource area in each downlink subframe to be transmitted in a specific periodicity over the corresponding carrier; or the UE receives, in a resource indication message sent over a primary carrier, a resource indicator corresponding to a resource occupancy scheme of the legacy control resource area and the enhanced control resource area in each downlink subframe to be transmitted in a specific periodicity over respective carriers. Reference can be made to the relevant description of the base station side for particular contents of the resource indication message, so a repeated description thereof will be omitted here.

Figure 10:
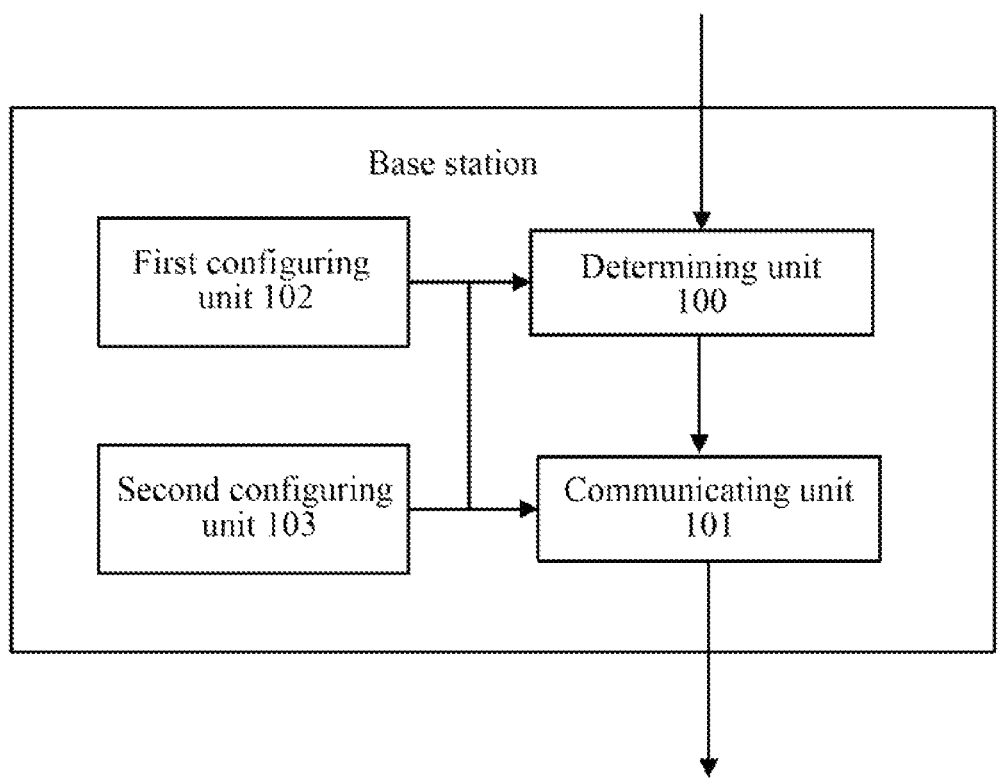
FIG. 10 is a schematic functionally structural diagram of a base station in an embodiment of the invention.

Based upon the foregoing embodiments, referring to FIG. 10, in an embodiment of the invention, a base station includes a determining unit 100 and a communicating unit 101, where:

The determining unit 100 is configured to determine downlink subframes to be transmitted and to determine respectively a resource occupancy scheme of a legacy control resource area and an enhanced control resource area in each downlink subframe to be transmitted.

The communicating unit 101 is configured to generate a corresponding resource indicator for the resource occupancy scheme of the legacy control resource area and the enhanced control resource area in each downlink subframe to be transmitted in a specific periodicity and to send the resource indicator to a UE in a resource indication message to instruct the UE to determine from the obtained resource indicator the resource occupancy scheme of the legacy control resource area and the enhanced control resource area in each downlink subframe to be transmitted in the specific periodicity.

As illustrated in FIG. 10, the base station further includes:

A first configuring unit 102 is configured to pre-determine whether to allow the determining unit 100 to transmit a control information carried on PHICH resource to the UE in the enhanced control resource area before the determining unit determines the downlink subframes to be transmitted.

A second configuring unit 103 is configured to configure the resource occupancy scheme of any downlink subframe by determining whether a downlink subframe to be configured currently is an Almost Blank Subframe (ABS) subframe, and if it is a non-ABS subframe, to configure PDCCH transmission or PHICH transmission in the legacy control resource area and/or the enhanced control resource area in the downlink subframe; or if it is an ABS subframe, to configure neither PDCCH transmission nor PHICH transmission in the legacy control resource area in the downlink subframe but PDCCH transmission or PHICH transmission in the enhanced control resource area in the downlink subframe.

Figure 11:
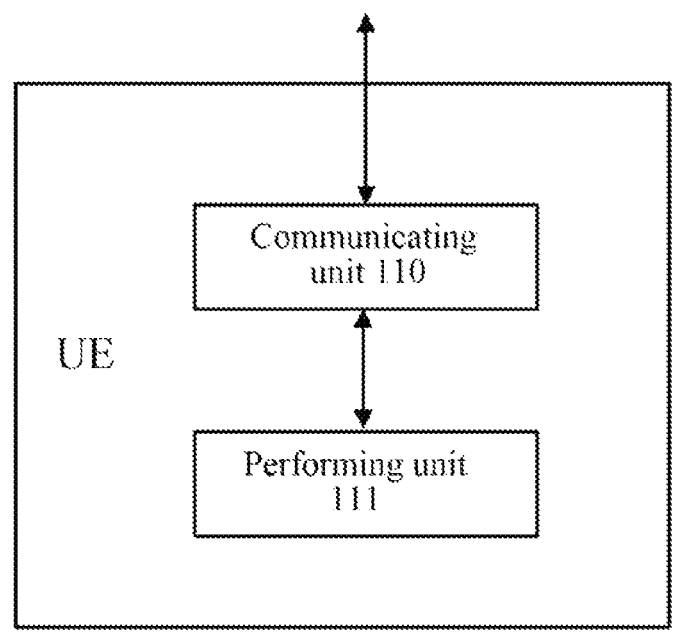
FIG. 11 is a schematic functionally structural diagram of a UE in an embodiment of the invention.

Referring to FIG. 11, in an embodiment of the invention, a UE includes a communicating unit 110 and a performing unit 111, where:

The communicating unit 110 is configured to receive a resource indication message, carrying a resource indicator, sent from a base station, where the resource indication message is generated by the base station for a resource occupancy scheme of a legacy control resource area and an enhanced control resource area in each downlink subframe to be transmitted in a specific periodicity; and The performing unit 111 is configured to determine from the obtained resource indicator the resource occupancy scheme of the legacy control resource area and the enhanced control resource area in each downlink subframe to be transmitted in the specific periodicity and to perform a corresponding resource handling mode according to the resource occupancy scheme.

In summary, in the embodiments of the invention, a base station determines downlink subframes to be transmitted, determines respectively a resource occupancy scheme of a legacy control resource area and an enhanced control resource area in each downlink subframe to be transmitted, generates a corresponding resource indicator for the resource occupancy scheme of the legacy control resource area and the enhanced control resource area in each downlink subframe to be transmitted in a specific periodicity, and sends the resource indicator to a UE in a resource indication message, and then the UE determines from the obtained resource indicator the resource occupancy scheme of the legacy control resource area and the enhanced control resource area in each downlink subframe to be transmitted in the specific periodicity and performs a corresponding resource handling mode, where the so-called resource occupancy scheme can be a transmission scheme of control information carried on PDCCH resource or can be a transmission scheme of control information carried on PHICH resource to thereby enable the UE to be aware of that control information carried on PDCCH resource or control information carried on PHICH resource is transmitted from the network side in the legacy control resource area and/or the enhanced control resource area or that control information carried on PDCCH resource or control information carried on PHICH resource is transmitted from the network side neither in the legacy control resource area nor in the enhanced control resource area, so that the UE can blindly detect in PDCCH common and user spaces or receive control information carried on the PHICH resource at an accurate position to thereby avoid unnecessary power consumption of and unnecessary interference to the UE due to blind detection or reception and improve effectively the performance of the system.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method of indicating a resource occupancy scheme, comprising:

a base station determining downlink subframes to be transmitted and determining respectively a resource occupancy scheme of a legacy control resource area and an enhanced control resource area in each downlink subframe to be transmitted; and the base station generating a resource indicator for the resource occupancy scheme of the legacy control resource area and the enhanced control resource area in each downlink subframe to be transmitted in a specific periodicity and sending the resource indicator to a User Equipment (UE) in a resource indication message to instruct the UE to determine from the obtained resource indicator the resource occupancy scheme of the legacy control resource area and the enhanced control resource area in each downlink subframe to be transmitted in the specific periodicity;

wherein the base station sending the resource indicator to the UE in the resource indication message to instruct the UE to determine from the obtained resource indicator the resource occupancy scheme of the legacy control resource area and the enhanced control resource area in each downlink subframe to be transmitted in the specific periodicity, comprises:

the base station sending the resource indicator to the UE in the resource indication message to instruct the UE to determine from the obtained resource indicator that control information is transmitted from the network side neither in the legacy control resource area nor in the enhanced control resource area, or that control information is transmitted from the network side in the legacy control resource area and/or the enhanced control resource area, respectively in each downlink subframe to be transmitted in the specific periodicity;

wherein before the downlink subframes to be transmitted are determined, the base station configures the resource occupancy scheme of any downlink subframe at least by:

the base station determining whether a downlink subframe to be configured is an Almost Blank Subframe (ABS) subframe, and if it is not an ABS subframe, then configuring control information transmission in the legacy control resource area and/or the enhanced control resource area in the downlink subframe; or if it is an ABS subframe, then configuring no control information transmission in the legacy control resource area in the downlink subframe but control information transmission in the enhanced control resource area in the downlink subframe.

2. The method according to claim 1, wherein the base station sending the resource indicator to the UE in the resource indication message comprises:

the base station sending a first resource sub-indicator to the UE in a resource indication message to notify the UE of various configured resource occupancy schemes; and the base station sending a second resource sub-indicator to the UE in a resource indication message to notify the UE of the resource occupancy scheme corresponding to each downlink subframe to be transmitted in the specific periodicity.

3. The method according to claim 1, wherein the base station sending the resource indicator to the UE in the resource indication message comprises:

the base station sending a third resource sub-indicator to the UE in a resource indication message to notify the UE of a resource occupancy scheme of the legacy control resource area in each downlink subframe in the specific periodicity; and the base station sending a fourth resource sub-indicator to the UE in a resource indication message to notify the UE of a resource occupancy scheme of the enhanced control resource area in each downlink subframe in the specific periodicity.

4. The method according to claim 1, wherein the base station configures the resource occupancy scheme of any downlink subframe by exchanging occupancy information of frequency resources with an other base station so that the base station and the other base station transmit control information over different frequency resources in the enhanced control resource area of the downlink subframe.

5. A method of processing a resource occupancy scheme indicator, comprising:

a User Equipment (UE) receiving a resource indication message, carrying a resource indicator, sent from a base station, wherein the resource indication message is generated by the base station for a resource occupancy scheme of a legacy control resource area and an enhanced control resource area in each downlink subframe to be transmitted in a specific periodicity; and the UE determining from the obtained resource indicator the resource occupancy scheme of the legacy control resource area and the enhanced control resource area in each downlink subframe to be transmitted in the specific periodicity and performing a resource handling mode according to the resource occupancy scheme;

wherein the UE determining from the obtained resource indicator the resource occupancy scheme of the legacy control resource area and the enhanced control resource area in each downlink subframe to be transmitted in the specific periodicity comprises:

the UE determining from the obtained resource indicator that control information is transmitted from the network side neither in the legacy control resource area nor in the enhanced control resource area, or that control information is transmitted from the network side in the legacy control resource area and/or the enhanced control resource area, respectively in each downlink subframe to be transmitted in the specific periodicity;

wherein the resource occupancy scheme of any downlink subframe is configured by the base station;

according to the resource occupancy scheme, control information is transmitted in the legacy control resource area and/or the enhanced control resource area in a downlink subframe when the downlink subframe is not configured to be an Almost Blank Subframe (ABS) subframe, and control information is not transmitted in the legacy control resource area in the downlink subframe but transmitted in the enhanced control resource area in the downlink subframe when the downlink subframe is configured to be an ABS subframe.

6. The method according to claim 5, wherein the UE receiving the resource indication message, carrying the resource indicator, sent from the base station comprises:

the UE receiving a resource indication message, carrying a first resource sub-indicator, sent from the base station and determining configured resource occupancy schemes from the first resource sub-indicator; and the UE receiving a resource indication message, carrying a second resource sub-indicator, sent from the base station and determining from the second resource sub-indicator the resource occupancy scheme corresponding to each downlink subframe to be transmitted in the specific periodicity.

7. The method according to claim 5, wherein the UE receiving the resource indication message, carrying the resource indicator, sent from the base station comprises:

the UE receiving a resource indication message, carrying a third resource sub-indicator, sent from the base station and determining from the third resource sub-indicator a resource occupancy scheme of the legacy control resource area in each downlink subframe to be transmitted in the specific periodicity; and the UE receiving a resource indication message, carrying a fourth resource sub-indicator, sent from the base station and determining from the fourth resource sub-indicator a resource occupancy scheme of the enhanced control resource area in each downlink subframe to be transmitted in the specific periodicity.

8. An apparatus of indicating a resource occupancy scheme, comprising:

a determining unit configured to determine downlink subframes to be transmitted and to determine respectively a resource occupancy scheme of a legacy control resource area and an enhanced control resource area in each downlink subframe to be transmitted; and a communicating unit configured to generate a resource indicator for the resource occupancy scheme of the legacy control resource area and the enhanced control resource area in each downlink subframe to be transmitted in a specific periodicity and to send the resource indicator to a User Equipment (UE) in a resource indication message to instruct the UE to determine from the obtained resource indicator the resource occupancy scheme of the legacy control resource area and the enhanced control resource area in each downlink subframe to be transmitted in the specific periodicity;

wherein the communicating unit sending the resource indicator to the UE in the resource indication message to instruct the UE to determine from the obtained resource indicator the resource occupancy scheme of the legacy control resource area and the enhanced control resource area in each downlink subframe to be transmitted in the specific periodicity comprises:

the communicating unit sending the resource indicator to the UE in the resource indication message to instruct the UE to determine from the obtained resource indicator that control information is transmitted from the network side neither in the legacy control resource area nor in the enhanced control resource area, or that control information is transmitted from the network side in the legacy control resource area and/or the enhanced control resource area, respectively in each downlink subframe to be transmitted in the specific periodicity;

the apparatus of indicating a resource occupancy scheme further comprising:

a second configuring unit configured to configure any downlink subframe by determining whether a downlink subframe to be configured currently is an Almost Blank Subframe (ABS) subframe, and if it is not an ABS subframe, to configure control information transmission in the legacy control resource area and/or the enhanced control resource area in the downlink subframe; or if it is an ABS subframe, to configure no control information transmission in the legacy control resource area in the downlink subframe but control information transmission in the enhanced control resource area in the downlink subframe.

9. The apparatus according to claim 8, wherein the communicating unit sending the resource indicator to the UE in the resource indication message comprises:

the communicating unit sending a first resource sub-indicator to the UE in a resource indication message to notify the UE of various configured resource occupancy schemes; and the communicating unit sending a second resource sub-indicator to the UE in a resource indication message to notify the UE of the resource occupancy scheme corresponding to each downlink subframe to be transmitted in the specific periodicity.

10. The apparatus according to claim 8, wherein the communicating unit sending the resource indicator to the UE in the resource indication message comprises:

the communicating unit sending a third resource sub-indicator to the UE in a resource indication message to notify the UE of a resource occupancy scheme of the legacy control resource area in each downlink subframe in the specific periodicity; and the communicating unit sending a fourth resource sub-indicator to the UE in a resource indication message to notify the UE of a resource occupancy scheme of the enhanced control resource area in each downlink subframe in the specific periodicity.

11. The apparatus according to claim 8, wherein the second configuring unit configures the resource occupancy scheme of any downlink subframe by exchanging occupancy information of frequency resources with another base station so that the base station and the other base station transmit control information over different frequency resources in the enhanced control resource area of the downlink subframe.

12. An apparatus of processing a resource occupancy scheme indicator, comprising:

a communicating unit configured to receive a resource indication message, carrying a resource indicator, sent from a base station, wherein the resource indication message is generated by the base station for a resource occupancy scheme of a legacy control resource area and an enhanced control resource area in each downlink subframe to be transmitted in a specific periodicity; and a performing unit configured to determine from the obtained resource indicator the resource occupancy scheme of the legacy control resource area and the enhanced control resource area in each downlink subframe to be transmitted in the specific periodicity and to perform a resource handling mode according to the resource occupancy scheme;

wherein the performing unit determining from the obtained resource indicator the resource occupancy scheme of the legacy control resource area and the enhanced control resource area in each downlink subframe to be transmitted in the specific periodicity comprises:

the performing unit determining from the obtained resource indicator that control information is transmitted from the network side neither in the legacy control resource area nor in the enhanced control resource area, or that control information is transmitted from the network side in the legacy control resource area and/or the enhanced control resource area, respectively in each downlink subframe to be transmitted in the specific periodicity;

wherein the resource occupancy scheme of any downlink subframe is configured by the base station;

according to the resource occupancy scheme, control information is transmitted in the legacy control resource area and/or the enhanced control resource area in a downlink subframe when the downlink subframe is not configured to be an Almost Blank Subframe (ABS) subframe, and control information is not transmitted in the legacy control resource area in the downlink subframe but transmitted in the enhanced control resource area in the downlink subframe when the downlink subframe is configured to be an ABS subframe.

13. The apparatus according to claim 12, wherein the communicating unit receiving the resource indication message, carrying the resource indicator, sent from the base station comprises:

the communicating unit receiving a resource indication message, carrying a first resource sub-indicator, sent from the base station and determining configured resource occupancy schemes from the first resource sub-indicator; and the communicating unit receiving a resource indication message, carrying a second resource sub-indicator, sent from the base station and determining from the second resource sub-indicator the resource occupancy scheme corresponding to each downlink subframe to be transmitted in the specific periodicity.

14. The apparatus according to claim 12, wherein the communicating unit receiving the resource indication message, carrying the resource indicator, sent from the base station comprises:

the communicating unit receiving a resource indication message, carrying a third resource sub-indicator, sent from the base station and determining from the third resource sub-indicator a resource occupancy scheme of the legacy control resource area in each downlink subframe to be transmitted in the specific periodicity; and the communicating unit receiving a resource indication message, carrying a fourth resource sub-indicator, sent from the base station and determining from the fourth resource sub-indicator a resource occupancy scheme of the enhanced control resource area in each downlink subframe to be transmitted in the specific periodicity.

\* \* \* \* \*